United States Patent [19]

Dugan

[11] 4,120,100
[45] Oct. 17, 1978

[54] EDUCATIONAL BOOK

[75] Inventor: Judith A. Dugan, Santa Barbara, Calif.

[73] Assignee: David S. Magee, Flint, Mich.; a part interest

[21] Appl. No.: 759,195

[22] Filed: Jan. 13, 1977

[51] Int. Cl.$^2$ ............................................. B44F 7/00
[52] U.S. Cl. .......................................... 35/73; 35/34; 35/35 E; 40/539; 46/1 L; 248/174; 428/11; 428/542
[58] Field of Search ................. 35/8 R, 34, 35 E, 40, 35/73; 40/126 A; 46/34, 30, 1 L, 257; 281/15 R; 428/7, 11, 542; 248/174; 229/DIG. 4

[56] References Cited

U.S. PATENT DOCUMENTS

| | | | |
|---|---|---|---|
| 981,485 | 1/1911 | Seldin | 248/174 X |
| 1,621,703 | 3/1927 | Adams | 428/11 X |
| 2,333,162 | 11/1943 | Eddy | 35/40 X |
| 3,271,884 | 9/1966 | Roberson | 35/35 E |
| 3,611,617 | 10/1971 | Foster | 46/1 L |
| 3,629,967 | 12/1971 | Bass | 46/1 L |

*Primary Examiner*—Harland S. Skogquist
*Attorney, Agent, or Firm*—Clarence A. O'Brien; Harvey B. Jacobson

[57] ABSTRACT

An educational book device having pages made from a plurality of flat sheets of printable material provided with a special configuration when in a flat form prior to assembly into the book form. The special configuration is such that the flat sheet may be folded in a manner so as to provide an extending flap portion. Additional fastening or securing strips may be provided for the flap in order to positively hold the flap together. A preformed notch on the outer corner edge of the extending flap permits the flap to be inserted into the pocket formed at the rear of the adjacent flap when the sheets are bound together in book form. Appropriate edges of the flat sheets are normally prepunched for reception of spiral-type binding material, but may also be secured together in conventional stitched and glued book fashion. One embodiment of the book is in the shape of a sphere, while additional embodiments are diamond-shaped, triangular-shaped, and rectangular cylindrical-shaped when assembled. Additional means for interlocking the flap of one page with the pocket formed at the rear of the flap of the adjacent page in various embodiments are also provided.

13 Claims, 19 Drawing Figures

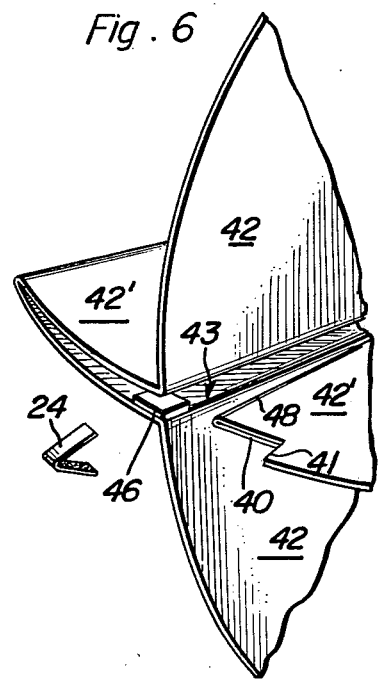
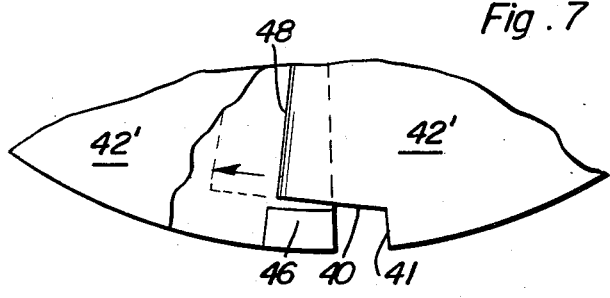
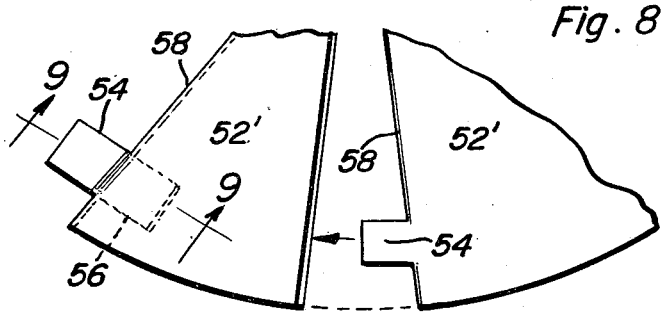
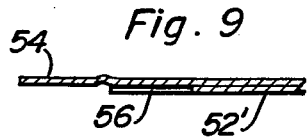
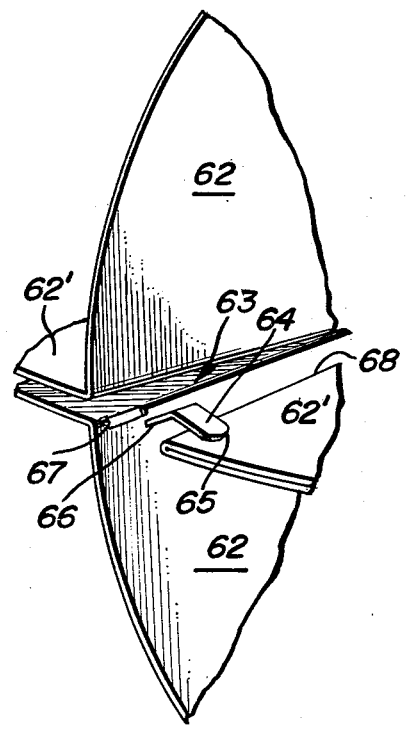
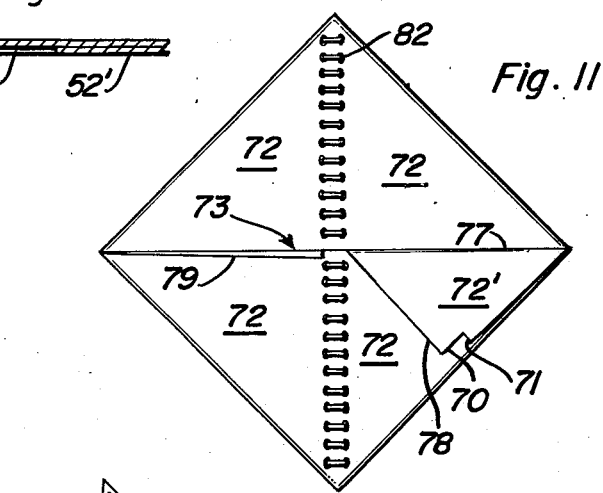
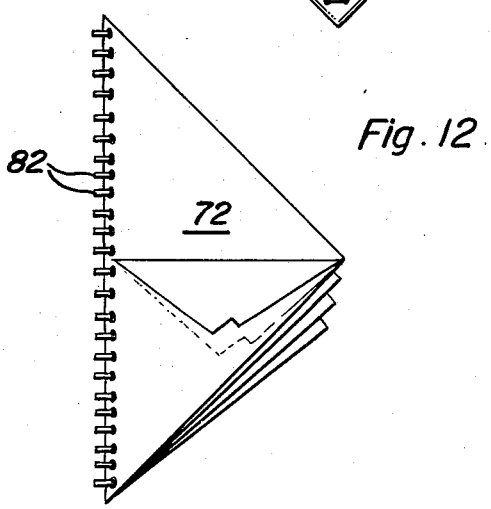

EDUCATIONAL BOOK

BACKGROUND OF THE INVENTION

1. Field of the Invention

This invention relates generally to structures for forming books of an educational nature.

2. Description of the Prior Art

One problem with previous devices for teaching spatial relationships of objects is in the resultant designs which fail to prevent an overlap of function.

Another common problem with known-type educational devices for providing instruction utilizing three-dimensional materials is that said materials are usually separate and distinct from the teaching and instructional units needed therewith. Being separate creates the disadvantage that the instructions may be lost or misplaced from the three-dimensional portion which will often render this portion substantially useless.

Another problem with known-type educational devices employing three-dimensional effects is that they normally are not provided with step-by-step means for instructing and teaching a student in the course of study in a foundation building manner. This often causes confusion and frustration on the part of the student and obviously reduces the amount the student can learn, and also the speed of student learning.

Another problem with known-type three-dimensional devices is that the construction often is such that the device may not be readily disassembled or folded into a compact flat form.

Known prior art patents which may be pertinent to this invention are as follows:

U.S. Pat. No. 2,333,162, Nov. 2, 1943
U.S. Pat. No. 2,354,381, July 25, 1944
U.S. Pat. No. 3,248,806, May 3, 1966

None of these known prior art devices offers the new and unique features of the invention disclosed herein.

For example, The J. D. Kennedy Globe (U.S. Pat. No. 2,354,381) does not overlap in design or functional abilities with the Educational Toy/Book of this invention. Rather than creating a spherical form through the juxtaposition of curved edges from connected semi-circular pages revolving on a central axis as in this invention, the Kennedy Globe concentrates on creating a solid spherical surface through dovetailing curved strips which could neither function as pages, nor illustrate the relationship of a two-dimensional geometric structure to its three-dimensional form.

The G. A. Eddy Globe design (U.S. Pat. No. 2,333,162) creates a sphere using flat semi-circles connected along a central axis, but it is not designed to either close into a book of pages or to retain a sturdy structure that can be rolled or played with once it is opened. The Eddy Globe has a base that has been designed as an extended portion of each semi-circular leaf which, when the globe is opened, is the only means of retaining its shape. The Eddy Globe readily collapses when not resting on its base. The design of this invention is such that each page interlocks with the next in order to form a structurally solid shape which will remain intact even when being rolled and played with. Naturally, even if the Eddy design and included some means of retaining a sturdy structure, the base would prevent its rolling, that being part of the intended function of the base.

The Schrader Map System (U.S. Pat. No. 3,248,806) neither forms a sphere of its parts, nor does it use a system of connections which when successively joined would form and retain a solid shape. The Schrader system does not attempt to, nor could it easily, illustrate the relationship of a 2-D circle to a 3-D sphere to a child. Further, as the Schrader pages may be turned along two perpendicular axes (East-West and North-South), it would not be conducive to the use of a story line or continuous verse as may be used in a book. Functioning as an educational book or toy was not the intended function of the Schrader design, nor would it be as effective as one which had the goals of the design of this invention in mind.

SUMMARY OF THE INVENTION

An object of the present invention is to provide an educational book having special configured printed pages which as the book is opened may be assembled so that upon final completion of the book an overall three-dimensional object has been formed.

Another object of the present invention is to provide an educational book device which may be changed from a conventional two-dimensional-type object into a three-dimensional-type one. Upon completion, various conventional shapes may be formed such as global, diamond-shaped, triangular-shaped, or rectangular cylindrical, as well as other shapes which are a combination of these. Other shapes and configurations are also envisioned, such as a bell-shaped book when assembled.

A further object of this invention is to provide a two-dimensional device in book form which is substantially semi-circular which may be erected as the device is used into a final globular or spherical form.

A still further object of this invention is to provide a flat educational book device having substantially triangular shape thereto which when erected or assembled will form a three-dimensional conical form or rhomboid form.

An additional further object of this invention is to provide an educational book device which in its flat form will be substantially rectangular and when assembled into three-dimensional form will form a rectangular cylindrical object.

Another additional object of this invention is to provide an educational book device having individual pages thereto with each page being provided with an extending flap portion with the flaps of one page fitting into the recess formed at the back of the flap of the preceding page together with interlocking means for retaining the flaps as assembled.

Still another additional object is to provide specially configured sheets of flat printable material with such special shape is required for folding and assembly into book form in order to create an educational book device from two-dimensional shape into three-dimensional form.

The educational book device of this invention has a number of new and unique features thereto. Each page of the book is basically of special configuration and arrangement so that the book may be handled in flat form, but may easily be erected and assembled into a three-dimensional object. The teaching material printed on the pages of the book correspond with a desired teaching object and the three-dimensional form resulting from completion of the book will emphasize and complete the educational information covered by the book.

In the preferred embodiment of the book, a semi-circular structure is achieved from initially three-quarter circle pages which when folded will provide an extending flap portion at the middle of the page with the diameter of the semi-circle forming the turning edges for the book pages, and with the semi-circular portion forming the outer edges of the book. The resulting curved flap edge is sealed making it a permanent flap and forming a straight opening and pocket inside the flap from the back thereof. When a plurality of such pages are joined along the respective straight edges thereof by appropriate spirals or ring binding material, the pages may be turned unhindered through a complete 360° along the binding axis. Thus, the book may actually be started and ended at various points thereof. When each flap is inserted into the pocket at the back of the preceding page, the book takes on a three-dimensional shape of a sphere or globe.

A number of important benefits are achieved in this new concept in book design. It will help develop spatial concepts with children as they discover the relationship of two-dimensional shapes with their three-dimensional counterparts. The book also combines the concept of a conventional-type book with that of a toy which alters the traditional perception of each as having logically separate designs and functions. The book is designed in such a way as to be easily constructed into a three-dimensional form by practically anyone, that is a small child, an elderly or feeble person, sick or incapacitated persons, physically handicapped persons, etc.

The book as disclosed in the primary embodiment folds easily into the shape of a flat semi-circular object when it is closed and yet as the pages are turned, the new and unique flap construction, permits the erection and assembly of the adjacent pages into the three-dimensional sphere. This easily illustrates the relationship of two-dimensional forms to that of three-dimensional ones to the use of the device.

The basic components of the book, that is the individual pages, are designed so as to be easily die-cut and printed with the appropriate educational material thereon while flat in order to avoid excessive manufacturing or printing costs. The pages may also be printed first and then die-cut, the order being relatively immaterial. The important concept being that the individual pages may be readily manufactured utilizing mass printing and production techniques with the result greatly reduced costs achievable thereby.

The curved edge of the flap which protrudes from the front of each semi-circular page is notched in such a way as to achieve two purposes, one being it prevents the flaps from sliding inside of one another and secondly, it automatically relates the proper depth of insertion into each adjacent page. The 360° degree rotation of pages about the binding edge allows for ease of construction. It also permits, especially if suggested in the text and/or book layout that it is not always necessary to think of a book as having a fixed beginning and end. That is, a user of the book may begin or end at any desired point.

While the primary embodiment illustrates a semi-circular flat book opening up into a sphere or globe-type three-dimensional object, other embodiments illustrate basic triangular shaped books when flat which may be opened into a conical shaped three-dimensional object or a rhomboid-shaped three-dimensional object. Another embodiment illustrates a conventional rectangular-shaped two-dimensional book when flat which opens into a cylindrical-shaped three-dimensional object. Combinations of these illustrated forms are also envisioned and intended to be covered by this disclosure.

The educational book may be made from a variety of materials, extending from ordinary weight paper to heavy cardboard, and even thin wood in some embodiments of the device. Also, plastic materials and plastic impregnated cloth materials may be used. While the educational book has been designed to function both as a book and as a toy, it could also be distributed and sold as a toy alone, or as a teaching aid for classrooms alone.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 6 is a perspective view of a fragmentary portion of a modified embodiment of the page interlocking structure of the invention.

FIG. 7 is a top plan view, partly broken away, of the embodiment of FIG. 6.

FIG. 8 is a top plan view of another embodiment of the page interlocking structure.

FIG. 9 is an elevational view, partly in cross section, taken generally along line 9—9 of FIG. 8.

FIG. 10 is a perspective view of still another embodiment of the interlocking structure of the invention.

FIG. 11 is a plan view of the diamond-shaped embodiment of the book.

FIG. 12 is a plan view of the diamond-shaped embodiment in the fully closed position and in the triangular shape thereof.

DESCRIPTION OF THE PREFERRED EMBODIMENT

Figure 5:
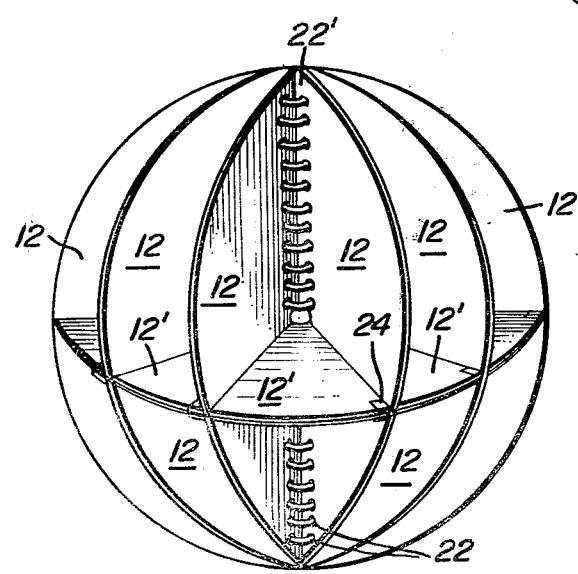
FIG. 5 is the educational book of this invention as fully assembled and in the shape of a globe.

Referring to FIG. 5 of the drawings, reference numeral 10 indicates in general the spherical or globular three-dimensional shape of the erected semi-circular two-dimensional book of this invention.

Figure 3:
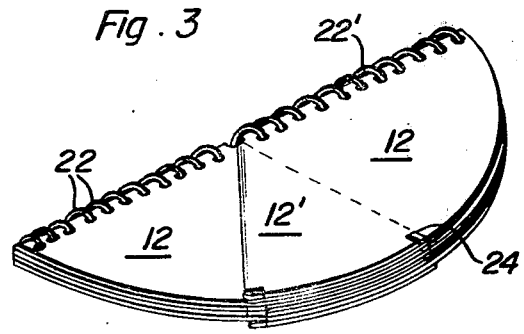
FIG. 3 is a perspective view of the semi-circular book as completed in flat form.

The basic educational book in unassembled two-dimensional form may be seen in FIG. 3. While the original page arrangement for use in assembly of this embodiment of the invention may be seen in FIG. 1.

Figure 1:
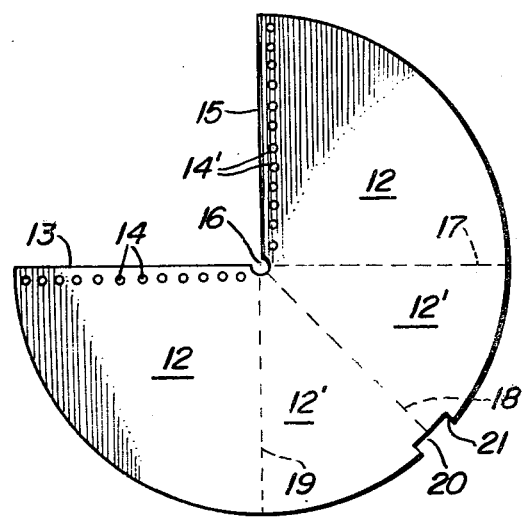
FIG. 1 is a top plan view of one of the specially configured pages for the book of this invention.

Looking at FIG. 1, the page is originally formed in the shape of a three-quarter circle having portions 12 diametrically opposite each other and interconnected by portions 12' on the lower right quadrant thereof. The upper left quadrant has been removed in order to form the three-quarter circle page. One edge 13 is thus provided while another edge 15 on the opposite side of the quadrant is also provided. Where these edges 13 and 15 intersect, a small hole 16 is preferably provided for ease in folding the flap portion of the page and also to prevent interference of extra thickened material at this point when the pages are completed. Also the hole prevents the binding from interfering with the flap. Normally, holes 14 and 14' will also be provided for reception of spiral or ring-type binding material as normally used in assembly of the book. A notch 20 is also provided on either side of the line bisecting the midpoint of the lower right quadrant, i.e., line 18. The notch 20 so provided will thus form edges 21 on either side thereof.

This page as shown in FIG. 1 may appropriately be printed with the proper information or educational material on the quadrants 12, and on both sides of each page if desired. Also, appropriate instructional material or the like may be provided on the portions 12' which will form the flaps for each page. Instructions as to how to insert the flaps into the preceding page etc. may be printed on this portion. Also, while the term printing is used, any type of means for applying material of an educational or instructional nature may be used on the pages, such as by silk screening, painting, photocopying mimeograph, or the like.

While the single page of FIG. 1 is shown and described as being circular with one quadrant removed, this is merely for the purpose of illustration. The angles and proportion of the removed area are not intended to be limited to an exact quadrant, or quarter of a circle. The size of the removed section may be varied depending on the total number of pages desired in the book, and thus in turn the necessary size of each flap to achieve the desired spacing between pages when the device is assembled.

Figure 2:
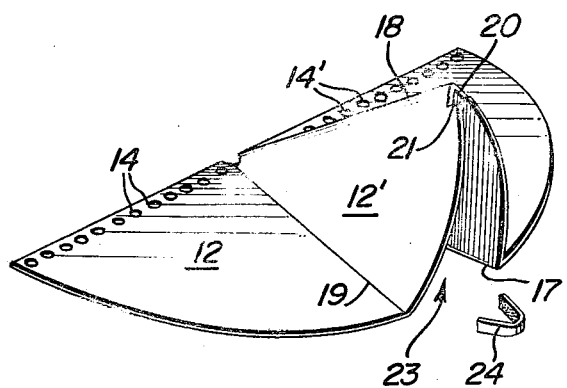
FIG. 2 is a perspective view of the single page of FIG. 1 with a partially formed flap.

FIG. 2 shows the flat sheet of FIG. 1 as partially folded to form a single page of the book. As can be seen the sheet of FIG. 1 is folded upwardly along lines 17 and 19 and folded along line 18 to form the projecting flap of FIG. 2. As can be seen in this Figure, an opening 23 will exist between the fold lines 17 and 19 of the flap. To retain the flap in the permanent folded position, sealing means normally is provided such as a strip 24 which may be applied along the outer portions of the flap adjacent the fold lines 17 and 19. The sealing strips 24 may be seen in the completed version of FIGS. 3, 4 and 5. As an alternative, the outer flap edges may be glued or otherwise sealed together using a plastic sealer, or a strongly bonding adhesive.

Figure 4:
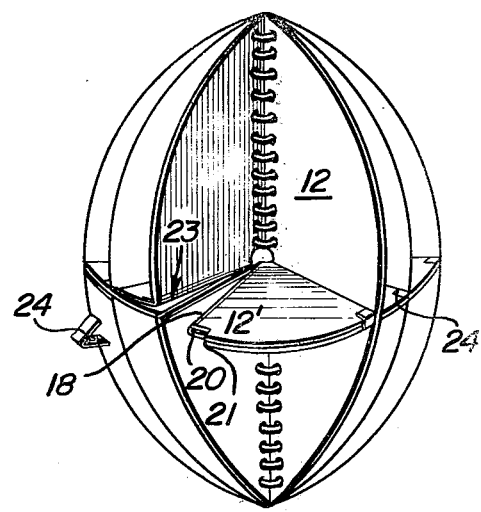
FIG. 4 is a perspective view of the book in the process of assembly.

From the two-dimensional form of FIG. 3, the educational book may be easily and simply erected and assembled by a user thereof in the manner shown in FIG. 4. Starting with the first page, or for that matter any page if the user so desires, the next adjacent page has the flap thereof moved from the flat position to a position approximately 90° or perpendicular to the page as in FIG. 4, and then the edge 18 of the flap is inserted within the pocket 23 formed at the back of the flap of the previous page.

The notch portion 20 will permit the flap to extend into the pocket 23 until the edge 21 contacts the outer portion of the pocket which is maintained tightly together by the strap 24, or other alternative fastening means. Thus, the friction of the material of the respective flap portions against each other will retain the device as assembled and completed in FIG. 5.

In these Figures a spiral binding has been applied to the one portion of the book at 22, while a similar binding has been applied at 22' to the other portion thereof. While two continuous spiral bindings are shown, a single spiral binding may be used for the entire book, or individual rings may be used instead of the spiral one. Other binding methods are also envisioned. It has been found in practice that plastic spirals are to be preferred because wire spirals eventually may bend out of shape and be otherwise more readily deformed, though, obviously, wire-type spirals or rings may be used. Commercial ring-type binders also may be used or cloth stripping adhered to the straight edges of the pages as seen in FIG. 2 may be used with pairs of in-position pages and then sewn or otherwise adhered to the other pages along the middle portion thereof. For a light paper-type version, which one could easily even make at home, conventional-type staples would be sufficient along the extended overlapping edges of a plurality of pages. While the spiral ring-type binding is preferred, obviously with a light paper version using staples for the binding interconnection, the relative cost of making an assembly would be minimal. Also, such making of an assembly could even be a class project in school, which would further enforce and achieve the desirable benefits desired in respect to the teaching of two-dimensional forms and their three-dimensional counterparts.

While the notch 20 and edge 21 method of interlocking the adjacent pages and associated flap structure functions very well, other methods of interlocking the pages may be used. Looking at FIGS. 6 and 7, another embodiment may be seen, wherein a wedge portion of material 46 is inserted between the flap opening 43 along the back edge thereof before the retaining strap 24 is secured thereto. Glue or similar fastening material may be provided for the wedge 46 to retain same between the inner portions of the flap and in such case the retaining fastener 24 may be eliminated. As can be seen in this version, the folded edge 48 of the rightmost flap is inserted into the pocket 43 formed by the back portion of the leftmost flap with the notch 40 permitting the flap to clear the wedge 46 until the abutting edge 41 is reached. This position is shown in dotted lines in FIG. 7, and at this point the three-dimensional form for these two portions of the book would be completed.

FIGS. 8 and 9 show another alternative method of flap interlock. In this embodiment, no notches are provided in the flat preassembled sheet forming the page of the book, but a rectangular flap portion 54 is preformed or die-cut along the lines 56 indicated so that when the flap 52' is formed by folding along line 58 to form the inserting edge of the flap, the tab or projection 54 is provided extending outwardly as shown in the views. Thus, the tab or flap 54 will extend into the recess formed between the back portions of the adjacent flap such as 23 and 43 of the previous embodiments. In this embodiment, the folded edge 58 merely aligns with the same plane as the back side of the adjacent flap. Also, if the friction retention of the leftmost flap pocket portion again the tab 54 is insufficient to properly retain the device as assembled, a slot such as the one 67 in FIG. 10 may be provided along one back edge of each adjacent flap pocket. In this embodiment of FIG. 10, the slots 67 are prepunched prior to the folding of the pages and in this embodiment a tab 64 is glued or otherwise fastened by means 65 to the folded edge 68 near the corner thereof. The flap portion 62' then may be retained within the pocket 63, or at least closely adjacent thereto by insertion of end 66 of the tab through the slotted aperture 67. Locking tab 64 in FIG. 10 could also be hooked behind an appropriately sized wedge similar to the one 46 in FIG. 6 as an alternative closing method. Depending on the type of material used for forming the pages of the book, these interlocking methods and various combinations thereof may be used as necessary in order to form an easily erectable three-dimensional form, yet positively and securely maintaining said shape once formed.

Figure 13:
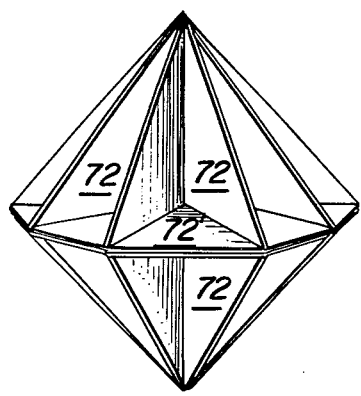
FIG. 13 is a perspective view of the diamond or rhomboid shape of the book in fully open and assembled three-dimensional form.

FIGS. 11, 12, and 13 show another embodiment of the educational book wherein the beginning flat folded shape is basically triangular as in FIG. 12, while the assembled three-dimensional form is basically of diamond shape or more properly in the shape of a rhomboid. The original pages for forming the book, as best visualized by looking at FIG. 11, start out as being basically square shaped with a corner quadrant removed, similar to the single sheet of FIG. 1 of the first embodiment, and then are folded along lines 77, 78 and 79 to form projecting flap portions 72' much in the manner of the pages of FIGS. 1 and 2. A notch 70 having edges 71 thereto also is provided in the same manner as the notch 20 and edges 21 of the first embodiment. Spiral binding 82 is also provided along the attaching edges of said pages similar to that described above. Any of the interlocking methods for the flaps as described above may also be used together with the notches 70 and edges 71, or in place thereof.

Figure 16:
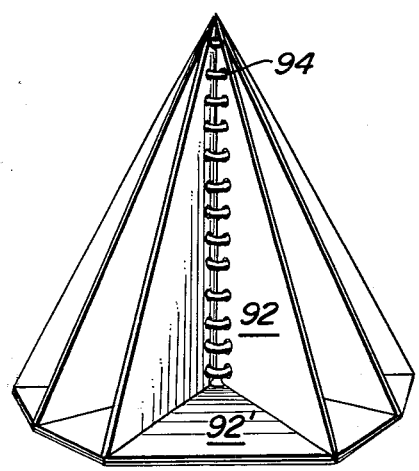
FIG. 16 is a perspective view of the three-dimensional shape of the conical embodiment when the book is fully opened and assembled.
Figure 14:
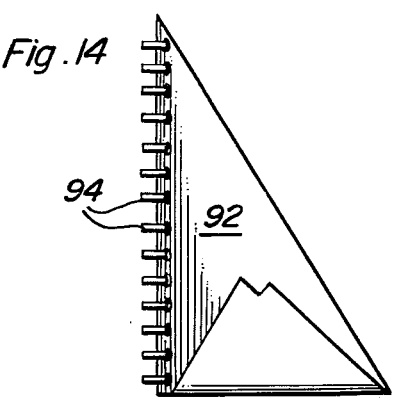
FIG. 14 is a plan view of a conical embodiment showing the triangular shape thereof in the closed book position.
Figure 15:
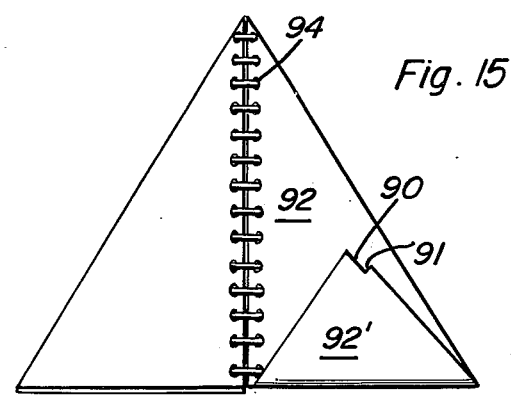
FIG. 15 is a plan view of the conical-shaped embodiment in the partially open position.

FIG. 14, 15 and 16 show another embodiment wherein the flat two-dimensional shape of the book is triangular as seen in FIG. 14 while the completed three-dimensional version forms a conical shape (FIG. 16). Spiral binding 94 again permits a 360° opening and rotation of the respective pages together with flaps 92', notch 90 and adjacent edge 91. Again, the size and shape of the flaps depend on the desired number of total pages in the book.

Figure 17:
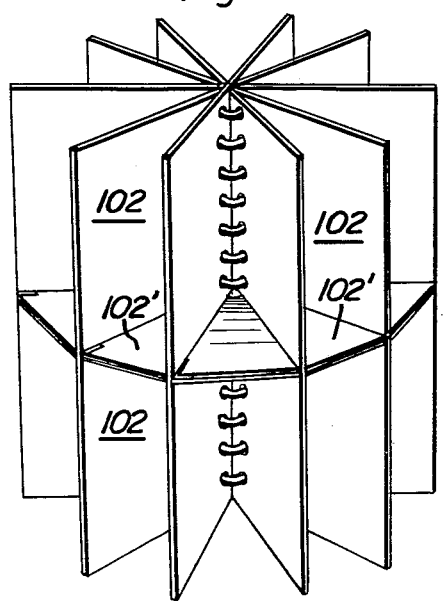
FIG. 17 is a perspective view of the rectangular cylindrical embodiment in fully opened three-dimensional assembled form.
Figure 18:
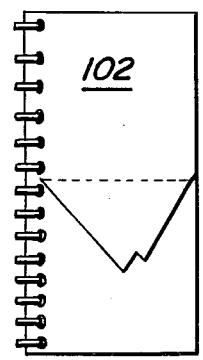
FIG. 18 is a plan view of the rectangular-shaped embodiment in fully closed position.
Figure 19:
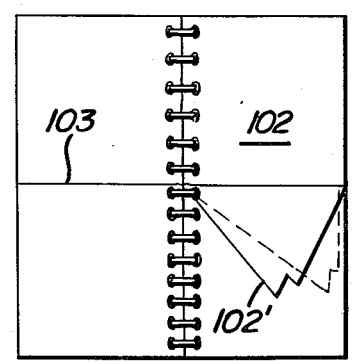
FIG. 19 is a plan view of the rectangular-shaped embodiment in partially open position and showing in dotted lines the opening of an interlocking flap.

FIGS. 17, 18 and 19 show a further embodiment basically rectangular in flat form as in FIG. 18, while forming a cylindrical three-dimensional shape as seen in FIG. 17. Again, flap portions 102' connect and hold the pages 102 to each other in the manner as described above. The dotted lines showing the flap 102' in FIG. 19 show the flap in its flat folded position and as partially moved toward the 90° or perpendicular position to the page prior to insertion in the pocket 103 of the preceding page. Again, any of the interlocking methods shown in the previous embodiments may be used instead of the notch and edge method as indicated in the dotted lines of FIG. 19.

While the drawings, FIGS. 11–19, show straight edged flaps, curved edges may also be provided as an optional alternative to afford a more cylindrical-, conical-, or rhomboid-like appearance in the fully constructed form.

As can be readily visualized by this disclosure, the educational book of this invention offers many important features and can greatly increase the educational process of users of the device. Also, various embodiments may be used as a toy, for example, by adding a handle to the version of either FIG. 13 or FIG. 16, a child could use the device as a top for spinning and the like.

The foregoing is considered as illustrative only of the principles of the invention. Further, since numerous modifications and changes will readily occur to those skilled in the art, it is not desired to limit the invention to the exact construction and operation shown and described and accordingly all suitable modifications and equivalents may be resorted to, falling within the scope of the invention.

What is claimed as new is as follows:

1. An educational book comprising:
   a plurality of pages having adjacent edges;
   fastening means for holding the pages together along the adjacent edges for turning movement relative to each other;
   means for interconnecting adjacent pages to assemble the book into a three-dimensional object, the interconnecting means including a flap portion extending from one surface of each page, the flap portion having spaced side walls connected along at least portions of the periphery thereof to define a pocket therebetween, the opening of each pocket communicating with the other surface of the page through said page and receiving at least portions of the flap portion of the rearwardly adjacent page thereinto to hold the pages together; and,
   wedge means disposed between the spaced side walls of each flap portion for providing an enlarged pocket between said spaced side walls.

2. The structure as set forth in claim 1, wherein the basic shape of the book in flat form is substantially semicircular and the shape of the book in erected three-dimensional form is substantially spherical.

3. The structure as set forth in claim 1, wherein the basic book in the flat two-dimensional shape is basically rectangular and when assembled into the three-dimensional configuration is basically cylindrical.

4. The book of claim 1 wherein each flap portion is formed by folding a portion of the page upon itself, the folded edge of each flap portion being inserted into the pocket formed in the forwardly adjacent page by the flap portion extending therefrom.

5. The book of claim 1 wherein the interlocking means comprises a notch formed in an outer corner of each flap portion, the notch receiving the wedge means thereinto to allow insertion of edge portions of each flap portion into the enlarged pocket formed in the forwardly adjacent page.

6. The book of claim 1 and further comprising means disposed at outer edge portions of each of the flap portions for maintaining at least portions of said outer edge portions together.

7. The structure as set forth in claim 1, wherein the fastening means for holding the pages of the book together include ring structure interconnecting edges of said pages.

8. The structure as set forth in claim 7, wherein the ring fastening structure consists of a single continuous spiral binding applied to appropriate apertures preformed in the edges of the book pages.

9. The structure as set forth in claim 1, wherein the shape of the book in flat two-dimensional form is basically triangular shape and when assembled into three-dimensional form is substantially in a shape having at least one conical portion.

10. The structure as set forth in claim 9, wherein the shape of the assembled three-dimensional form of the book is substantially in the shape of a rhomboid.

11. The book of claim 1 and further comprising means for interlocking at least portions of each flap portion within the pocket in the forwardly adjacent page.

12. The book of claim 11 wherein the interlocking means comprises a notch formed in an outer corner of each flap portion.

13. An educational book having a plurality of pages, each page comprising:
- a flat sheet of circular configuration and having a section removed therefrom;
- the portion of the flat sheet directly opposite the removed section being foldable to form a flap portion extending from one surface of said sheet;
- means for holding the pages together for turning movement relative to each other; and,
- means carried on each page for interlocking each page with a forwardly adjacent page, portions of the flap portions of each pages being inserted into a pocket formed in a forwardly adjacent page by the folding thereof to form the flap portion thereon.

* * * * *